(12) United States Patent
Leeds

(10) Patent No.: US 7,941,950 B2  
(45) Date of Patent: May 17, 2011

(54) FOLDABLE, IN-STORE ADVERTISING COVER FOR SECURITY SYSTEM

(75) Inventor: Douglas B. Leeds, New York, NY (US)

(73) Assignee: Storeboard Media, LLC, New York, NY (US)

( * ) Notice: Subject to any disclaimer, the term of this patent is extended or adjusted under 35 U.S.C. 154(b) by 140 days.

(21) Appl. No.: 12/283,766

(22) Filed: Sep. 16, 2008

(65) Prior Publication Data

US 2010/0070371 A1 Mar. 18, 2010

(51) Int. Cl.
*G09F 15/00* (2006.01)

(52) U.S. Cl. .................................. 40/606.01; 40/606.18

(58) Field of Classification Search ............... 40/606.01, 40/606.18; 150/154

See application file for complete search history.

(56) References Cited

U.S. PATENT DOCUMENTS

| | | | | |
|---|---|---|---|---|
| 4,726,446 A | * | 2/1988 | Perbix | 182/46 |
| 4,771,560 A | * | 9/1988 | Richards | 40/607.03 |
| 4,885,860 A | * | 12/1989 | Huenefeld | 40/607.03 |
| 5,787,621 A | * | 8/1998 | Leksell | 40/607.03 |
| 6,672,366 B1 | * | 1/2004 | Wade et al. | 160/371 |
| 7,198,835 B2 | * | 4/2007 | Anderson | 428/100 |
| 7,299,578 B2 | * | 11/2007 | Molinaro | 40/606.01 |
| 7,596,896 B2 | * | 10/2009 | Crowell et al. | 40/124.07 |
| 7,634,865 B2 | * | 12/2009 | L'Hotel | 40/610 |
| 2005/0235538 A1 | * | 10/2005 | Hansen | 40/611.01 |
| 2007/0245610 A1 | * | 10/2007 | Mestres Armengol et al. | 40/610 |

* cited by examiner

*Primary Examiner* — Cassandra Davis

(74) *Attorney, Agent, or Firm* — Kirschstein et al.

(57) ABSTRACT

An in-store advertising cover for installation onto and covering an upright security fixture includes a pair of front and rear, arcuate panels joined together along side, linear edges to form a lens-shaped cross section when the fixture is covered. A crease extends transversely across the arcuate panels between the side edges. The arcuate panels are foldable about the crease when the fixture is not covered, for example, during shipping, and are unfolded during installation. A lower half of the cover is initially installed on the fixture, followed by an upper half. Advertising material is applied on one or both arcuate panels. The advertising material is visible when viewed off to one side of the respective unfolded arcuate panels.

1 Claim, 2 Drawing Sheets

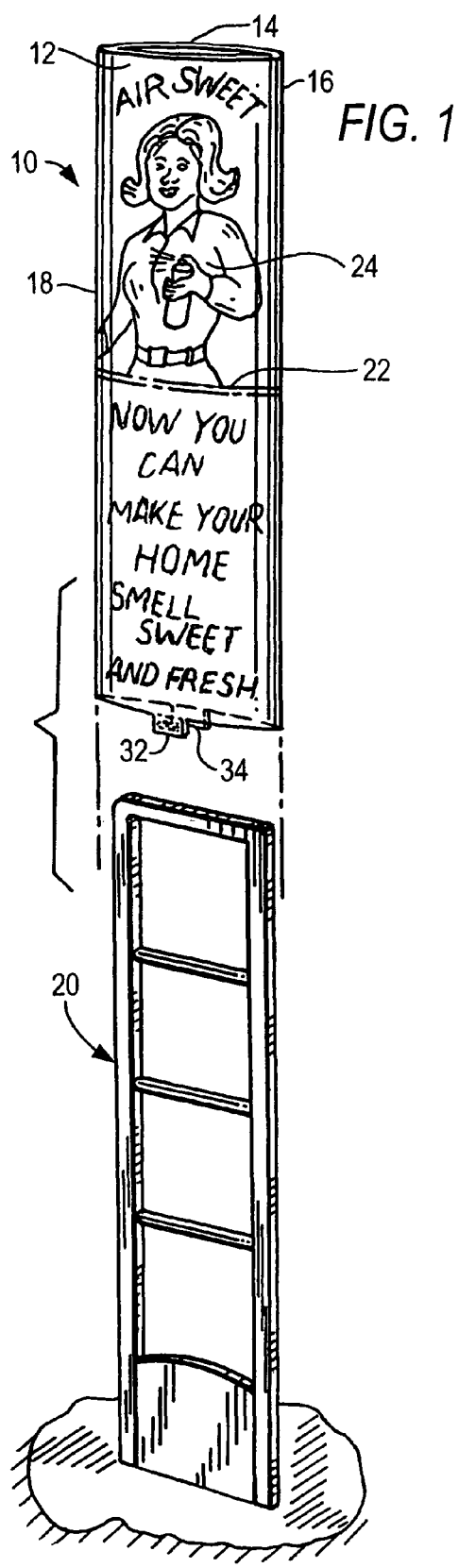
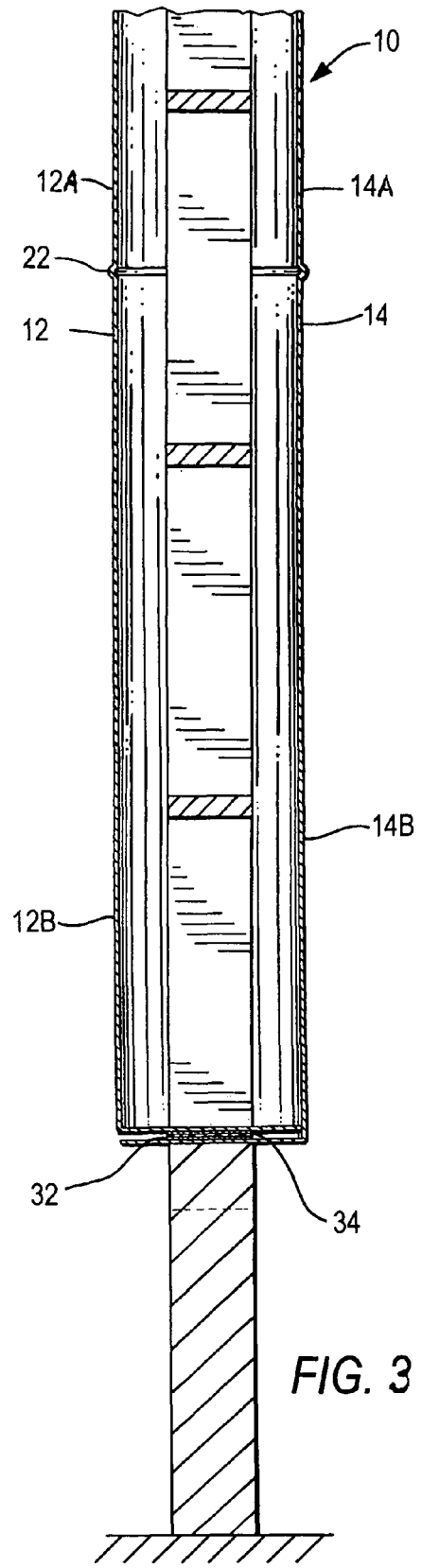

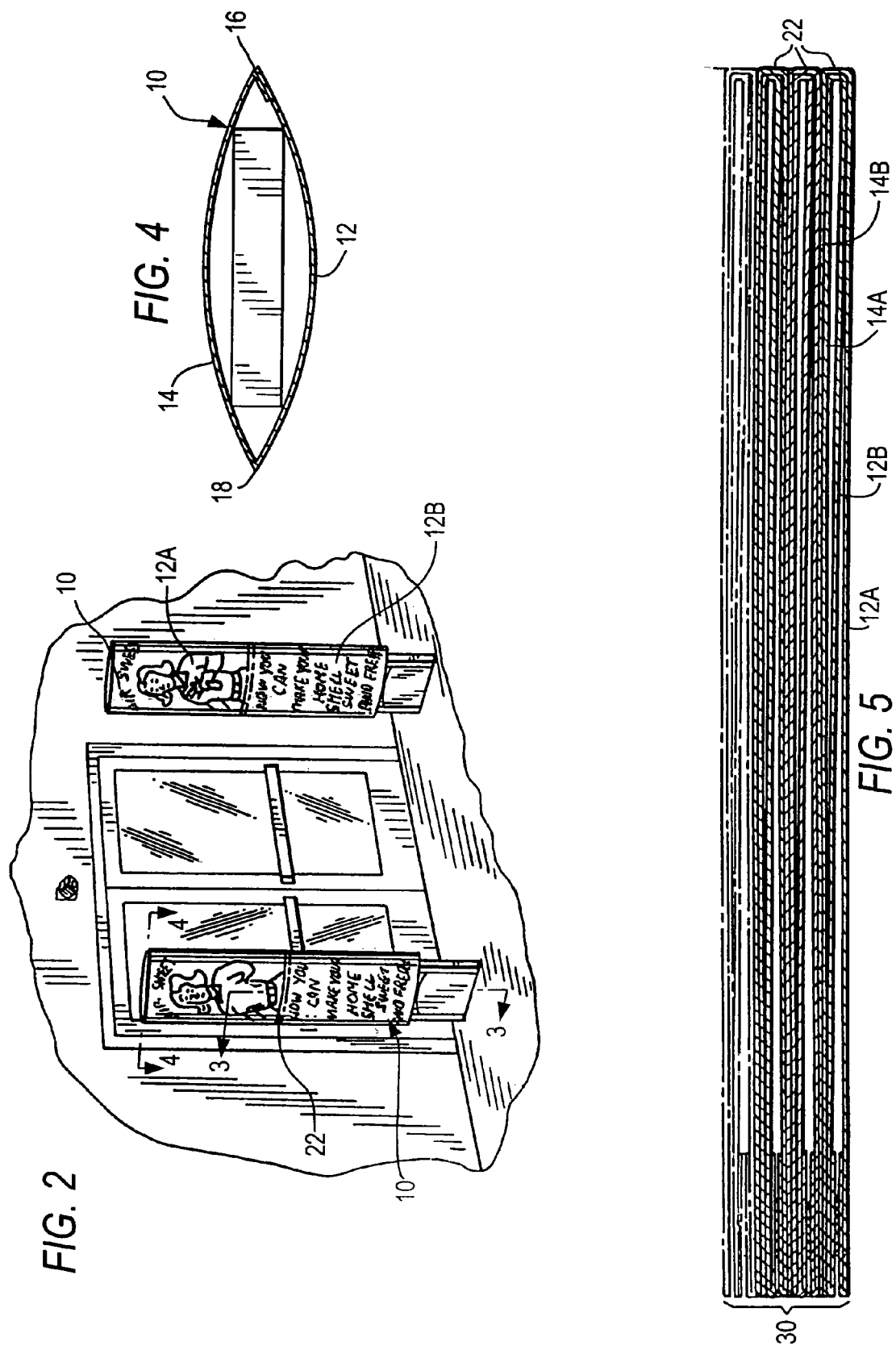

FOLDABLE, IN-STORE ADVERTISING COVER FOR SECURITY SYSTEM

BACKGROUND OF THE INVENTION

This invention generally relates to in-store advertising covers that are fitted over and installed on retail security systems adjacent store exits and entrances and, more particularly, to rendering such covers more compact for easier and less expensive shipping of the covers to the stores, to rendering such covers less cumbersome to install, and to rendering promotional material on such covers more visually prominent to passersby.

Retail security systems have been used in conjunction with radio frequency identification (RFID) devices or tag transponders affixed to retail merchandise. The tag transponders were removed or deactivated at checkout counters of a store at the time of purchase of the merchandise. The security systems were typically positioned at store exits and entrances and had RFID circuitry to electromagnetically detect the passage of any tag transponders that had not been removed or deactivated. The security systems emitted audible sounds and/or silent alarms to remote security personnel.

The RFID circuitry of each security system was typically housed in at least one of a pair of upright fixtures each measuring about four feet in height, two feet in width and two inches in depth near each store exit or entrance. Each pair of fixtures framed an aisle leading out of, or into, the store. Additional pairs of such fixtures could also be provided. The fixtures were easily noticeable, and their mere presence upset some customers who were disturbed by the store's silent allegation of stealing.

To at least partially conceal these fixtures, and to gain a retail benefit, U.S. Pat. No. 7,299,578 proposed that covers bearing promotional messages and advertising be fitted over these security fixtures. Thus, these advertising covers, not the fixtures, were noticeable upon entrance into the store, and upon exit therefrom.

As advantageous as these advertising covers were in concealing these fixtures, as well as in advertising merchandise or services offered in or outside the stores, the known covers have not proven to be altogether satisfactory. Their large size made them difficult and relatively expensive to ship to the stores, as well as cumbersome to install over the fixtures. Some installers had to stand on ladders to raise the covers to a height above the fixtures prior to lowering the covers onto the fixtures during installation. Some stores had insufficient ceiling clearance to allow the covers to be so raised. Also, each of these advertising covers had a generally rectangular cross section with planar, front and back, panels whose promotional information was best seen only when one stood directly in front of each panel.

SUMMARY OF THE INVENTION

One aspect of this invention is directed to an advertising cover for installation onto and covering an upright security fixture. The cover includes a pair of front and rear, arcuate panels joined together along side, linear edges to form a lens-shaped cross section when the fixture is covered. A crease extends transversely across the arcuate panels between the side edges. The arcuate panels are foldable about the crease when the fixture is not covered, for example, during shipment of the cover, and are unfolded during installation. Advertising material is applied, preferably by printing, on one or both of the arcuate panels, which advantageously include paper sheets. The advertising material is visible when viewed off to one side of the respective unfolded arcuate panel.

In the preferred embodiment, the side edges extend vertically in mutual parallelism in a common vertical plane when the fixture is covered, and the crease extends horizontally and intersects both the side edges. The crease divides, preferably centrally, the arcuate panels into upper panel portions and lower panel portions of equal size. The upper panel portions overlay the lower panel portions after folding of the arcuate panels about the crease.

Advantageously, a pair of mounting tabs is provided on lower edges of the arcuate panels. The tabs are adhered together when the fixture is covered to hold the arcuate panels in said lens-shaped cross section.

Another aspect of this invention is directed to a method of installing the advertising cover onto the upright security fixture by performing the steps of joining the pair of front and rear, arcuate panels together along the side, linear edges to form the advertising cover, folding the arcuate panels about the crease extending transversely across the arcuate panels between the side edges, applying the advertising material on at least one of the arcuate panels, and covering the fixture by unfolding the arcuate panels and positioning the cover on opposite sides of the fixture. The cover has a lens-shaped cross section after the positioning, and the advertising material is visible when viewed off to one side of the at least one unfolded arcuate panel after the positioning step was performed.

Thus, this invention not only effectively conceals the fixture, but also more prominently advertises merchandise or services offered in or outside the store, because a viewer need not stand directly in front of each panel to see the advertising material thereon. The viewer can see the advertising material as he or she approaches the cover from the side. Also, despite its large size, the cover is relatively inexpensive to ship to the store, because it is folded into a more compact form factor by virtue of the crease. The known advertising covers had a generally rectangular cross section, which could not be so folded. Moreover, the folded cover greatly eases installation, because it allows the installer to first install the lower panel portions onto the fixture, and then unfold or straighten out the cover, and then install the upper panel portions onto the fixture. Ceiling height is no longer an obstacle to installation of the cover.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is an exploded, perspective view showing an in-store advertising cover in accordance with this invention for covering a security system fixture;

FIG. 2 is a perspective view showing two such covers framing a store exit;

FIG. 3 is a broken-away, sectional view taken on the line 3-3 of FIG. 2;

FIG. 4 is a sectional view taken on the line 4-4 of FIG. 2; and

FIG. 5 is a sectional view of a stack of folded covers.

DETAILED DESCRIPTION OF THE PREFERRED EMBODIMENTS

Referring now to the drawings, reference numeral 10 generally identifies an advertising cover for installation onto and covering an upright security fixture 20. The cover 10 includes a pair of front and rear, arcuate panels 12, 14 joined together along side, linear edges 16, 18 to form a lens-shaped cross section (see FIG. 4) when the fixture 20 is covered. The lens-shaped cross section can be defined as the area of overlap of two circles of equal radii and whose centers are less than one of the radii apart. A crease 22 extends transversely across the arcuate panels 12, 14 between the side edges 16, 18. The arcuate panels 12, 14 are foldable about the crease 22 when the fixture 20 is not covered, and are unfolded during installation. Advertising material 24 is applied, preferably by printing, on one or both of the arcuate panels 12, 14, which advantageously include paper sheets. The advertising material 24 is visible when viewed off to one side of the respective unfolded arcuate panel.

In the preferred embodiment, the side edges 16,18 extend vertically in mutual parallelism in a common vertical plane when the fixture 20 is covered, and the crease 22 extends horizontally and intersects both the side edges 16,18. The crease 22 preferably centrally divides the arcuate panels 12, 14 into upper panel portions 12A, 14A and lower panel portions 12B, 14B of equal size. The upper panel portions 12A, 14A overlay the lower panel portions 12B, 14B after folding of the arcuate panels 12, 14 about the crease 22. FIG. 5 depicts a stack 30 of folded covers 10. The folded covers occupy a much smaller volume of space as compared to unfolded covers and, hence, are less expensive to ship and store and are easier to handle.

Advantageously, a pair of mounting tabs 32, 34 is provided on lower edges of the arcuate panels 12, 14. The tabs 32, 34 are adhered together when the fixture 20 is covered to hold the arcuate panels 12, 14 in said lens-shaped cross section. The tabs 32, 34 are preferably located midway between the side edges 16, 18.

Thus, this invention not only effectively conceals the fixture 20, but also more prominently advertises merchandise or services offered in or outside the store, because a viewer need not stand directly in front of each panel 12, 14 to see the advertising material 24 thereon. The viewer can see the advertising material 24 as he or she approaches the cover 10 from the side. Also, despite their large size, the cover 10 is relatively inexpensive to ship to the store, because it is folded into a more compact form factor by virtue of the crease 22. The known advertising covers had a generally rectangular cross section, which could not be so folded. Moreover, the folded cover 10 greatly eases installation, because it allows an installer to first install the lower panel portions 12B, 14B of the folded cover 10 onto the fixture 20, and then unfold or straighten out the cover 10, and then install the upper panel portions 12A, 14A onto the fixture 20. Ceiling height is no longer an obstacle to installation of the cover 10. The crease 22 allows installation of the lower half of the cover 10 first, followed by installation of the upper half of the cover 10.

It will be understood that each of the elements described above, or two or more together, also may find a useful application in other types of constructions differing from the types described above.

For example, the advertising material 24 can consist of artwork and/or text. One pair of tabs 32, 34 is deemed to be sufficient to hold the cover on the fixture 20, although more than one pair of tabs could also be employed. The cover 10 is advantageously constituted of a heavy duty paper material to which a paper sheet containing the advertising material 24 is laminated.

While the invention has been illustrated and described as embodied in a foldable, in-store advertising cover for a security system and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of installing a hollow, tubular, advertising sleeve having juxtaposed panels folded about a crease line extending transversely across the panels between side longitudinal edges of the sleeve onto an upright security fixture extending upwardly from a floor, comprising the steps of:

unfolding the folded sleeve, and initially fitting unfolded lower sleeve portions of the unfolded sleeve below the crease line onto an upper part of the fixture so that the unfolded lower sleeve portions surround the upper part of the fixture, and subsequently lowering the unfolded sleeve onto the fixture toward the floor until unfolded upper sleeve portions of the unfolded sleeve above the crease line surround the upper part of the fixture;

adhering a pair of mounting tabs on lower edges of the panels together above a lower part of the fixture after said lowering step, the adhered mounting tabs resting on top of the lower fixture part to hold the panels in arcuate mirror-symmetrical shapes on the lower fixture part above the floor; and printing advertising material on at least one of the arcuate panels to enable viewing of the advertising material off to one side of the at least one arcuate panel.

* * * * *